United States Patent [19]

Barger et al.

[11] 4,221,957
[45] Sep. 9, 1980

[54] WELDING FLUX CLOSED LOOP SYSTEM

[75] Inventors: John J. Barger, Ringgold, Ga.;
Waylon C. Powell, Chattanooga;
James R. Underwood, Cleveland,
both of Tenn.

[73] Assignee: Combustion Engineering, Inc.,
Windsor, Conn.

[21] Appl. No.: 16,717

[22] Filed: Mar. 1, 1979

[51] Int. Cl.² ............................................. B23K 9/18
[52] U.S. Cl. ..................................... 219/73.2; 219/73
[58] Field of Search ..................... 219/73.2, 73.21, 73;
51/263

[56] References Cited

U.S. PATENT DOCUMENTS 2,390,560 12/1945 Stanley ................................. 219/73.2
2,690,493 9/1954 Schaefer .............................. 219/73.2
3,898,415 8/1975 D'Acremont ................. 219/73.21 X Primary Examiner—E. A. Goldberg
Attorney, Agent, or Firm—Arthur L. Wade

[57] ABSTRACT

Granulated welding flux is supplied under fluid pressure from a reservoir mounted at a convenient location for reloading. The reservoir is connected to an elevated vacuum tank. Recovered excess flux is also brought up to the vacuum tank, both sources of flux maintaining a predetermined level of flux within the vacuum tank. A conduit from the vacuum tank provides gravity feed of flux from the tank to a lower divider box from which a plurality of conduits deliver flux to the traveling welding arc from behind and in front of the arc between the tip of the welding electrode and the work piece.

5 Claims, 1 Drawing Figure

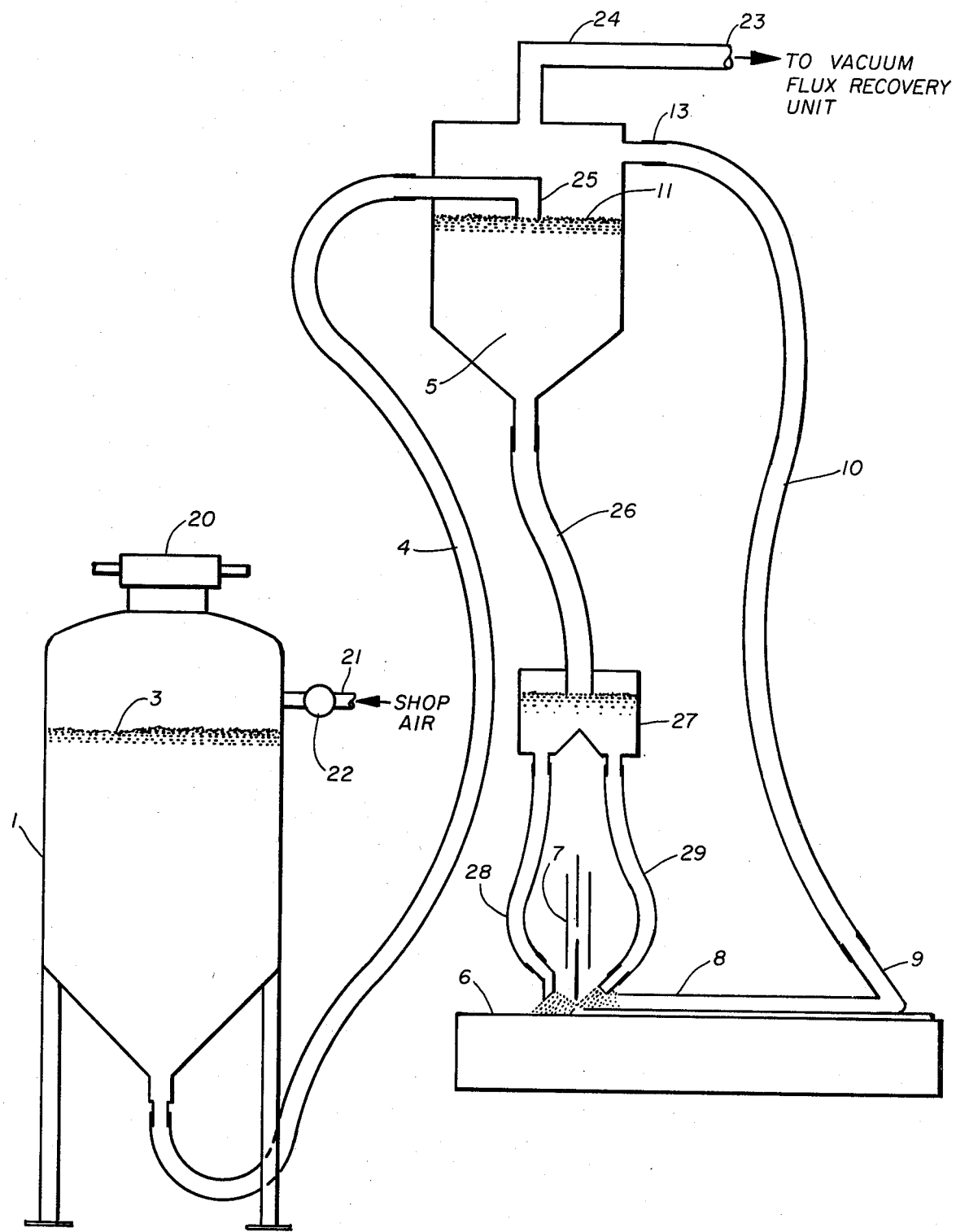

WELDING FLUX CLOSED LOOP SYSTEM

BACKGROUND OF THE INVENTION

1. Field of the Invention

The present invention relates to systems for supplying flux in granulated form to submerge a welding arc from an elevated gravity tank which is supplied from a fluid-pressured flux supply. More specifically, the invention relates to pressurizing a tank of granulated flux at a point where reloading is convenient, providing means for maintaining flux level in the elevated vacuum tank and gravitating to a lower splitter box where the flux supply may be readily observed by an operator.

2. Prior Art

The metallurgical demands of a welding process commonly require the actual arc between the end of the electrode and the work piece to be completely covered, or submerged, by a body of flux. Thus, the term "submerged arc" welding indicates the basic requirements of this form of welding.

Superficially, this appears to be an elementary principle under which a supply of granulated flux is maintained well above the point at which the arc is sustained to flow the flux, under gravity, down to cover the arc. However, the usual multiplicity of details of any seemingly simple process complicates the answer to maintaining continuous supply of the flux as it uniformly envelopes the arc.

It is not unusual to require a 10-hour supply of granulated flux to a welding arc which is laying down 120 lbs. of metal per hour. The large quantity of flux required over the long period of time makes it inconvenient to locate the tank of flux on the support for the welding apparatus. A significant problem develops in providing the reloadable reservoir of flux material near a convenient ground-level location to one side of the welding machine.

It is necessary to get a vacuum tank above the working surface where the arc is sustained for gravity feed of the welding flux. However, once the conduit system from the vacuum tank provides for gravity feed of the welding flux to the working surface, the operator of the welding machine requires immediate information, which can be obtained by a glance, of the short term supply of flux available to the arc.

SUMMARY OF THE INVENTION

The present invention provides a conveniently rechargeable supply of welding flux for a submerged arc near ground level with fluid power boosting flux from the supply up to the vacuum box of a gravity system for the flux to the submerged arc.

The invention further provides an open distributor box receiving the gravity-fed flux from the vacuum tank with which the operator can directly observe the supply of flux immediately available to the distributor system for the flux at the submerged arc.

Other objects, advantages and features of the invention will become apparent to one skilled in the art upon consideration of the written specification, appended claims, and accompanying drawing.

BRIEF DESCRIPTION OF THE DRAWING

The drawing is a somewhat diagrammatic elevation view of a flux supply system for submerging a welding arc and embodying the present invention.

DESCRIPTION OF THE PREFERRED EMBODIMENT

Referring specifically to the drawing, the embodying structure of the invention is dominated by pressure tank 1 which is disclosed as mounted at a location convenient for reloading. Preferably, this convenient location is at ground level, although not necessarily so. A supply of granular flux, or granulated welding flux 2, is held in storage within the vessel of reservoir 1 and replaced up to predetermined level 3.

The flux is forced up conduit 4 as a supply to vacuum tank 5. Vacuum tank 5 is located at a position elevated above welding work surface 6. From this elevated position, vacuum tank 5 supplies the granular flux therein, by gravity, to submerge the arc sustained between the electrode 7 and the work surface 6. The weld metal from the arc is indicated at 8. The weld flux is supplied in excess to assure submergence of the arc. The excess weld flux is recovered from the track of weld 8 by nozzle 9 in which there is developed a vacuum through hose 10. Hose 10 provides a path to return the excess weld flux to vacuum tank 5 where it combines with the new flux supplied from the vessel of reservoir 1 to maintain a predetermined level of flux at 11.

In providing a continuous supply of flux in the quantity, and for the period of time, demanded by massive industrial fabrication, it is imperative that a large reservoir vessel provide a huge inventory of flux material. The vessel for this reservoir must be mounted near the floor at which operating personnel are working to manipulate, service, and repair arc welding apparatus. The very size of vessel 1 demands its installation, preferably at ground level, where its inventory of flux can be replinished through opening 20. However, it is reemphasized that the reservoir is not necessarily mounted at ground level. Further, fluid pressure must be supplied to the flux surface at level 3 to force the flux up conduit 4 to the vacuum tank. A well-filtered supply of clean air is presumed to be available through conduit 21. Regulation of this filtered clean air is symbolized by regulator 22 mounted in conduit 21. This regulator 22 is the responsibility of attending personnel and must be maintained regularly. This responsibility can best be discharged at, or near, ground level.

Vacuum tank 5 is a chamber into which the new flux of conduit 4 is directed as well as the chamber to which a vacuum pump is attached. Vacuum pump 23 is indicated in conduit 24. Conduit 24 is indicated as penetrating the upper portion of the vacuum tank 5 so that the subatmospheric pressure is developed on both the surface 11 and in conduit 10.

A nozzle 25 is provided conduit 4, such nozzle extending into the chamber space above flux surface 11. Nozzle 25 opens downwardly toward surface 11. It is expected that surface 11 will elevate in tank 5 to meet the downwardly opening nozzle 25 and effectively seal off the pressure forcing the flux material to chamber 5. Therefore, the downwardly opening nozzle 25 will be uncovered by the decrease in elevation of surface 11 only enough for the new flux forced to chamber 5 and the old flux arriving through conduit 10 to elevate the level 11 until it cuts off the fluid pressure of conduit 4.

The inventory of flux in chamber 5, made up from new and reclaimed flux, is provided a path by conduit 26, down which the flux gravitates to submerge the arc between electrode 7 and work surface 6. An operator needs a readily available visual observation of the short-term supply of flux flowing to the arc. The present invention provides this observation by means of the open top of the divider box 27.

Divider box 27 is essentially an open hopper into which the flux of tank 5 gravitates through conduit 26. Further, box 27 is provided with compartmenting which effectively divides the body of weld flux gravitating therefrom into conduit 28 and conduit 29. It is a conception of the invention that box 27, with its compartments, divides the flux into a portion which flows toward the welding arc from in front of electrode 7 and conduit 29 flows a portion of the flux toward the arc from a position to the rear of the arc of electrode 7. In further description, conduit 28 dumps its flux in front of moving electrode 7 and conduit 29 dumps its load of flux toward the rear of electrode 7. Therefore, with the gravity system dumping flux fore and aft the traveling electrode, the flux insures total submergence of the arc sustained between the electrode and the work piece. Obviously, the amount of flux is in surplux to that needed. This overkill of quantity is permissible because the vacuum system of conduit 10 picks up the surplus from track 8 and recycles it up to gravity tank 5.

The basic problem of operation of this closed system for weld flux supply to the arc of electrode 7 centers around vacuum tank 5 and its supply of flux to conduit 26. The force of gravity is expected to act on the flux to move the material downward. The downward force of gravity is opposed by the force of the vacuum generated above level 11 of this flux. Basically, the column of flux must move downwardly to keep the hopper, or divider box 27, filled with a continual supply for conduits 28 and 29. Therefore, the force of the upwardly acting vacuum of tank 5 must be overcome by the downward force of gravity to provide the continual downward feed of the flux toward its ultimate destination at the welding arc. This regulation lies basically in sizing the inventory of flux in chamber 5 and conduit 26, along with the size and speed of the vacuum pump 23 in conduit 24. Maintaining this relation of forces is not a prodigious task, but the ultimate objective of continual supply of flux to the welding arc must be uninterrupted and consistent.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

An many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for supplying flux to a submerged welding arc, including;
   a work surface upon which there is an electric arc welding operation;
   a charged electrode suspended a predetermined distance above the work surface to sustain the electric arc between the end of the electrode and the work surface;
   a rechargeable container for an inventory of welding flux mounted at a convenient location relative to ground level and at a predetermined lateral distance from the work surface;
   a chamber mounted at a predetermined elevation above the electric arc;
   a conduit connecting the reservoir of flux and the chamber above the electric arc;
   a source of fluid pressure connected to the reservoir to force flux from the reservoir to the elevated chamber;
   a conduit system connecting the elevated chamber to a location adjacent the electric arc, including,
      (a) an open-topped box mounted between the elevated chamber and the electric arc,
      (b) a conduit connected to the elevated chamber and extending down into the open top of the box,
      (c) compartments mounted within the open-topped box to divide the flux received from the elevated chamber into separate portions,
      (d) and a conduit for each of the flux portions connected to each compartment of the box through which the flux portion gravitates to and is deposited over the electric arc;
   and a vacuum system arranged to collect and conduct excess flux behind the moving electrode to the elevated chamber.

2. The system of claim 1, in which,
   the elevated chamber connected to the reservoir of flux and the vacuum system combine the flux from both sources to form a predetermined level of flux within the elevated chamber from which the flux gravitates to the electric arc through the conduit system.

3. The system of claim 2, including,
   a nozzle mounted to extend within the elevated chamber and open downwardly toward the surface of the flux within the chamber to engage the surface of the inventory of flux within the elevated chamber,
   and a connection between the nozzle and the conduit connected to the flux reservoir,
   whereby the fluid pressure of the conduit connected to the nozzle is sealed by the flux surface in the elevated chamber to prevent the forcing of flux from the reservoir into the elevated chamber.

4. The system of claim 3, wherein the vacuum system includes,
   a conduit whose lower end extends from the excess flux at the working surface and whose upper connection extends into the elevated chamber and above the inventory of flux within the elevated chamber,
   and a pump which is connected to the top portion of the elevated chamber to develop a vacuum above the inventory of flux within the elevated chamber and within the conduit extending to the working surface.

5. A closed system for supplying welding flux to a submerged electric arc, including,
   a rechargeable container for a large inventory of flux mounted near ground level,
   means for manually replenishing the inventory of flux within the container,
   a fluid pressure connected to the upper portion of the container for applying pressure to the inventory of flux, a conduit connecting the lower portion of the container to an elevated position, a tank mounted at the elevated position and connected to the conduit from the reservoir to receive the flux forced by the fluid pressure from the container and up the conduit to the elevated position, a conduit connected by its upper end to the lower portion of the elevated tank, an open-topped box mounted below the elevated tank and receiving the lower end of the conduit from the lower portion of the tank, compartments within the open-topped box arranged to receive portions of the flux gravitated from the tank, a working surface for a welding operation established at a location below the open-topped box, a charged electrode suspended above the working surface to sustain an electric arc between the end of the electrode and the working surface, a conduit between each compartment of the open-topped box extending downward to a position adjacent the electric arc to gravitate flux from the box compartment to submerge the arc, and a vacuum system arranged to recover excess flux from the welding operation and transfer the excess flux to the elevated tank where the surplus flux combines with the flux ejected from the reservoir to maintain a predetermined level of flux in the tank while personnel readily observe through the open top of the box the immediate supply of flux available to submerge the electric arc.

* * * * *